United States Patent [19]

Chambless

[11] Patent Number: 5,738,400

[45] Date of Patent: Apr. 14, 1998

[54] EGG RETRIEVER

[76] Inventor: Jack Chambless, Rte. 1, Box 210, Buchanan Dam, Tex. 78609

[21] Appl. No.: 745,908

[22] Filed: Nov. 7, 1996

[51] Int. Cl.$^6$ .................................................. B25J 1/04
[52] U.S. Cl. ............................................ 294/19.1; 294/55
[58] Field of Search ........................... 294/1.1, 1.3–1.5, 294/19.1, 19.2, 55; 56/332; 119/329, 334; 15/257.1, 257.4, 257.6, 104.8; 43/7, 11

[56] References Cited

U.S. PATENT DOCUMENTS

| 589,047 | 8/1897 | Thomas . | |
| 2,653,403 | 9/1953 | Oslund | 56/332 |
| 2,792,683 | 5/1957 | Sigler | 294/19.2 |
| 3,120,714 | 2/1964 | Goodwin . | |
| 3,141,696 | 7/1964 | Nau | 294/19.2 |
| 3,548,531 | 12/1970 | Holden . | |
| 3,977,422 | 8/1976 | Cabaluna | 294/1.4 |
| 4,194,779 | 3/1980 | Ouhashi | 294/19.2 |
| 4,200,321 | 4/1980 | Warkentin | 294/1.4 |
| 5,361,528 | 11/1994 | Peacock . | |
| 5,513,884 | 5/1996 | Bucher | 294/19.2 |

Primary Examiner—Dean Kramer
Attorney, Agent, or Firm—Dilworth & Barrese

[57] ABSTRACT

An egg retriever is provided which includes a net supported by a rim having a scoop portion thereon to define a mouth and to form a holding pouch, and a handle connected to the rim. The scoop portion includes a blade adapted for scooping an egg within the holding pouch. When the egg is within the holding pouch, the mouth of the mesh net may be closed to prevent the egg from falling out of the holding pouch.

12 Claims, 3 Drawing Sheets

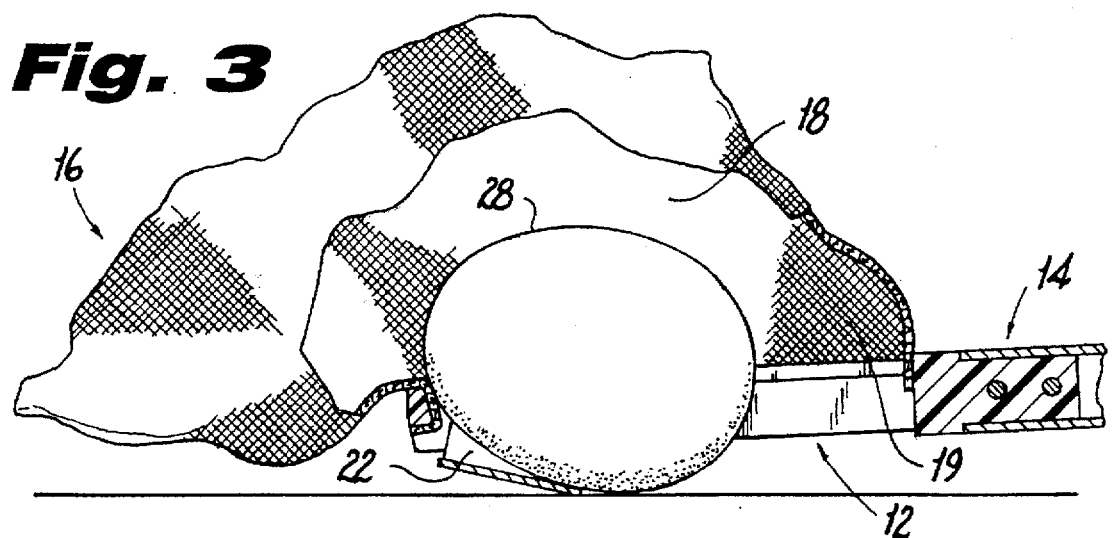
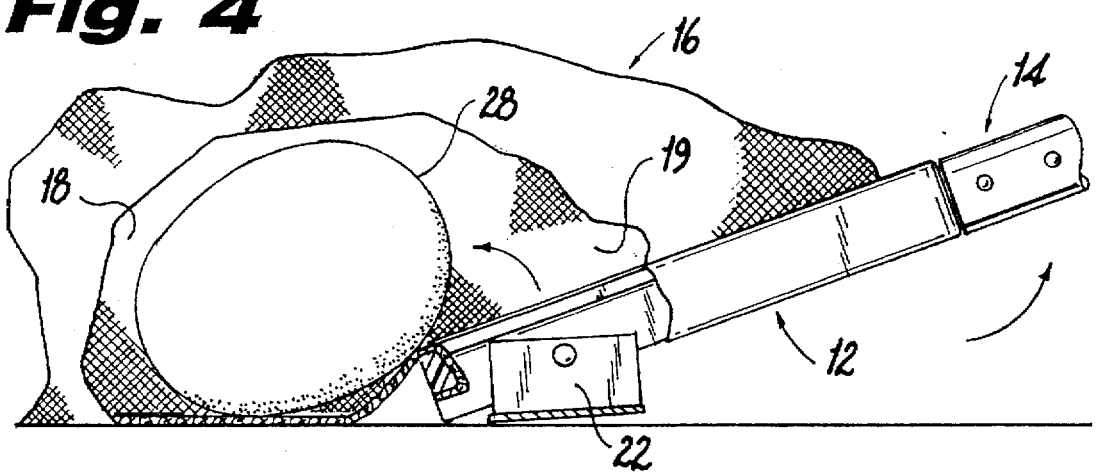
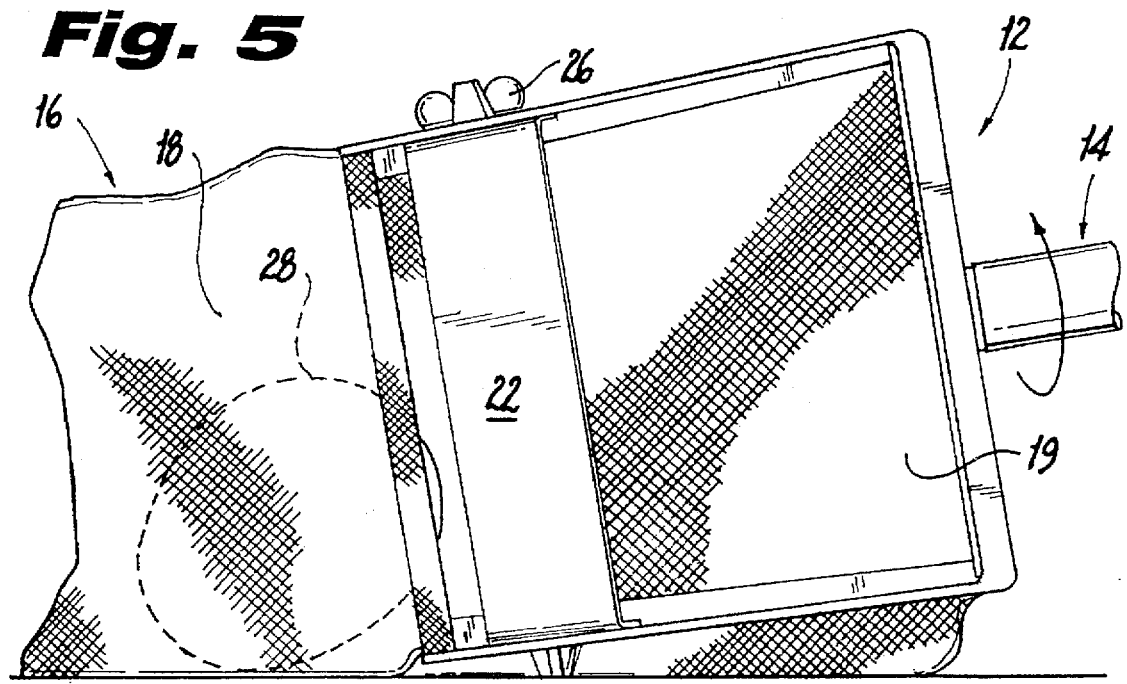

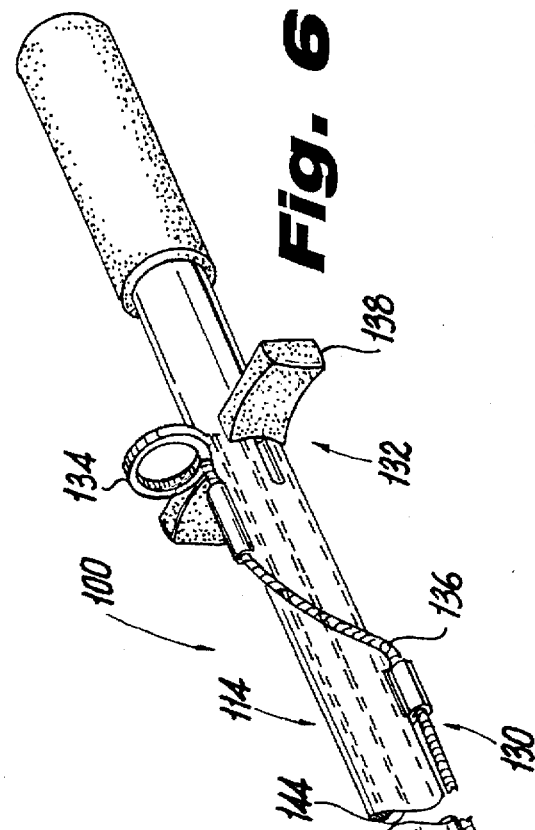
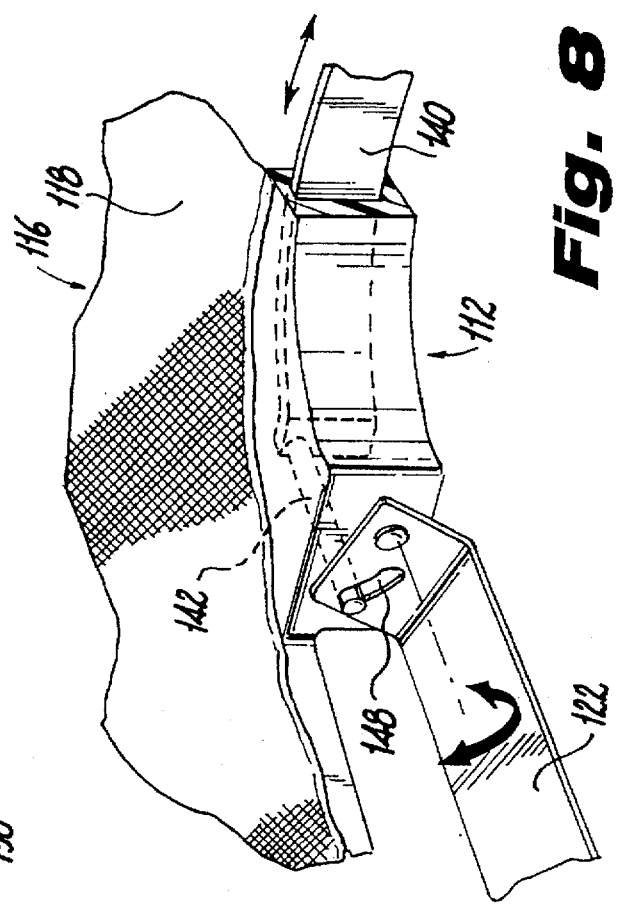
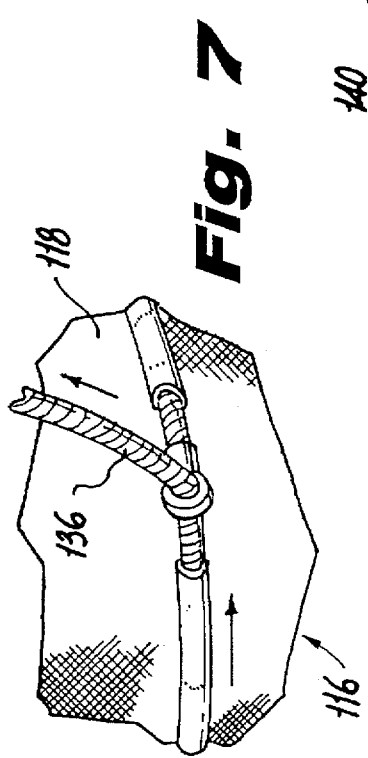
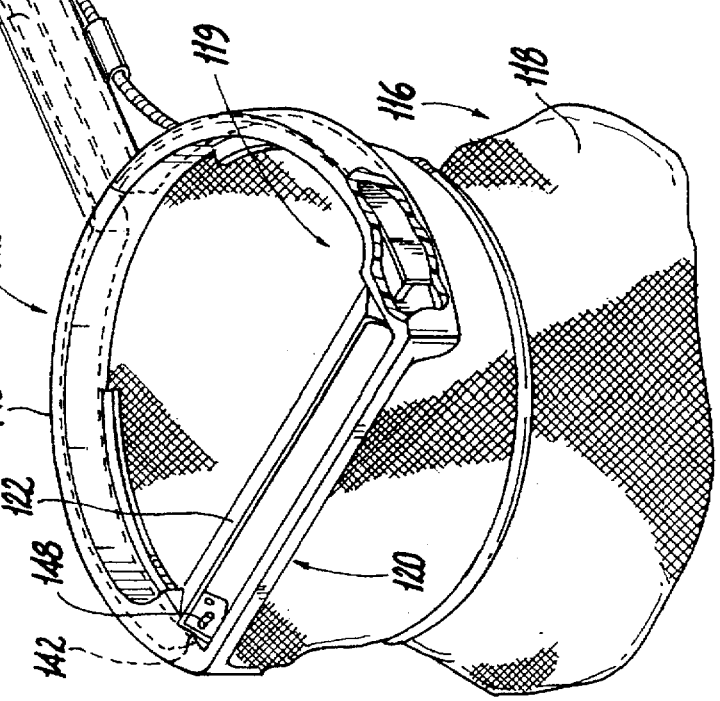

EGG RETRIEVER

FIELD OF THE INVENTION

The present invention relates to an apparatus for retrieving a stationary ovoid object. More particularly, the present invention is directed to an egg retriever for remotely retrieving an egg from an extended distance.

BACKGROUND OF THE INVENTION

One aspect of ostrich breeding entails retrieving a fertilized ostrich egg from the ostrich pen and placing it in an incubator. The retrieval of a fertilized ostrich egg from the ostrich pen is necessary to encourage the ostrich to lay another fertilized ostrich egg. An ostrich will not lay a fertilized egg while it is waiting for an existing unhatched egg to hatch.

The retrieval of a fertilized ostrich egg generally requires one to distract the ostrich away from the egg, such as by enticing the ostrich with food. When the ostrich has moved away from the fertilized egg, another individual enters the ostrich pen, grabs the egg, and exits the ostrich pen before the ostrich has a chance to return to the site of the egg.

This method of retrieving a fertilized ostrich egg poses a danger to the individual who enters the ostrich pen and attempts to retrieve the ostrich egg. If the ostrich prematurely returns to the site of the ostrich egg, the ostrich will fiercely attack that individual. Therefore, ostrich breeders quite often face the risk of being attacked and seriously injured by an ostrich when entering the ostrich pen to retrieve an ostrich egg.

Due to the danger posed to an individual who attempts to retrieve a fertilized egg from an ostrich pen, a need exists to provide an egg retriever which obviates this danger. It is an object of this invention, therefore, to provide an egg retriever which can retrieve an ostrich egg without placing any individual at the risk of being attacked and seriously injured by an ostrich.

SUMMARY OF THE INVENTION

The present invention relates to an egg retriever which includes a net connected to the rim, and a blade which is movably connected to the rim and adapted to scoop the egg within the holding pouch.

BRIEF DESCRIPTION OF THE DRAWINGS

FIG. 3 illustrates the scoop portion of the rim positioned underneath the egg;

FIG. 4 illustrates the egg within the holding pouch;

FIG. 5 illustrates the egg retriever turned one-quarter clockwise to safely secure the egg within the holding pouch;

FIG. 6 is a perspective view of an alternative embodiment of the egg retriever of FIG. 1 having an assembly for closing the opening of the holding pouch and an assembly for pivoting the blade;

FIG. 7 is an enlarged perspective view of a cord wrapping the mesh net of the egg retriever of FIG. 6 to create a cinching action; and FIG. 8 is an enlarged perspective view of the blade and its connection to the rim of the egg retriever of FIG. 6.

DETAILED DESCRIPTION OF THE PREFERRED EMBODIMENTS

Figure 1:
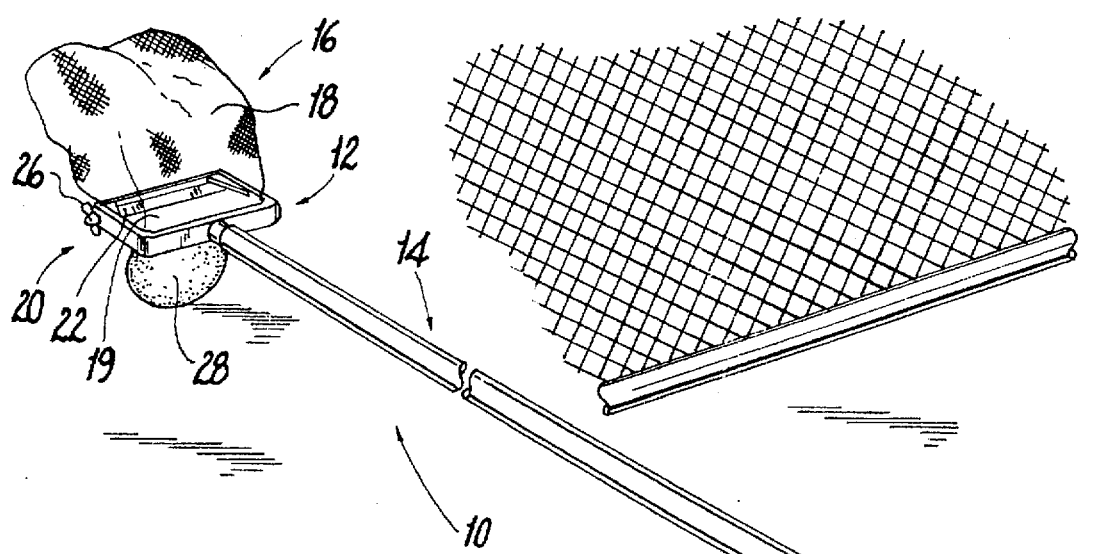
FIG. 1 is a perspective view of the egg retriever having features of the present invention retrieving an ostrich egg.
Figure 2:
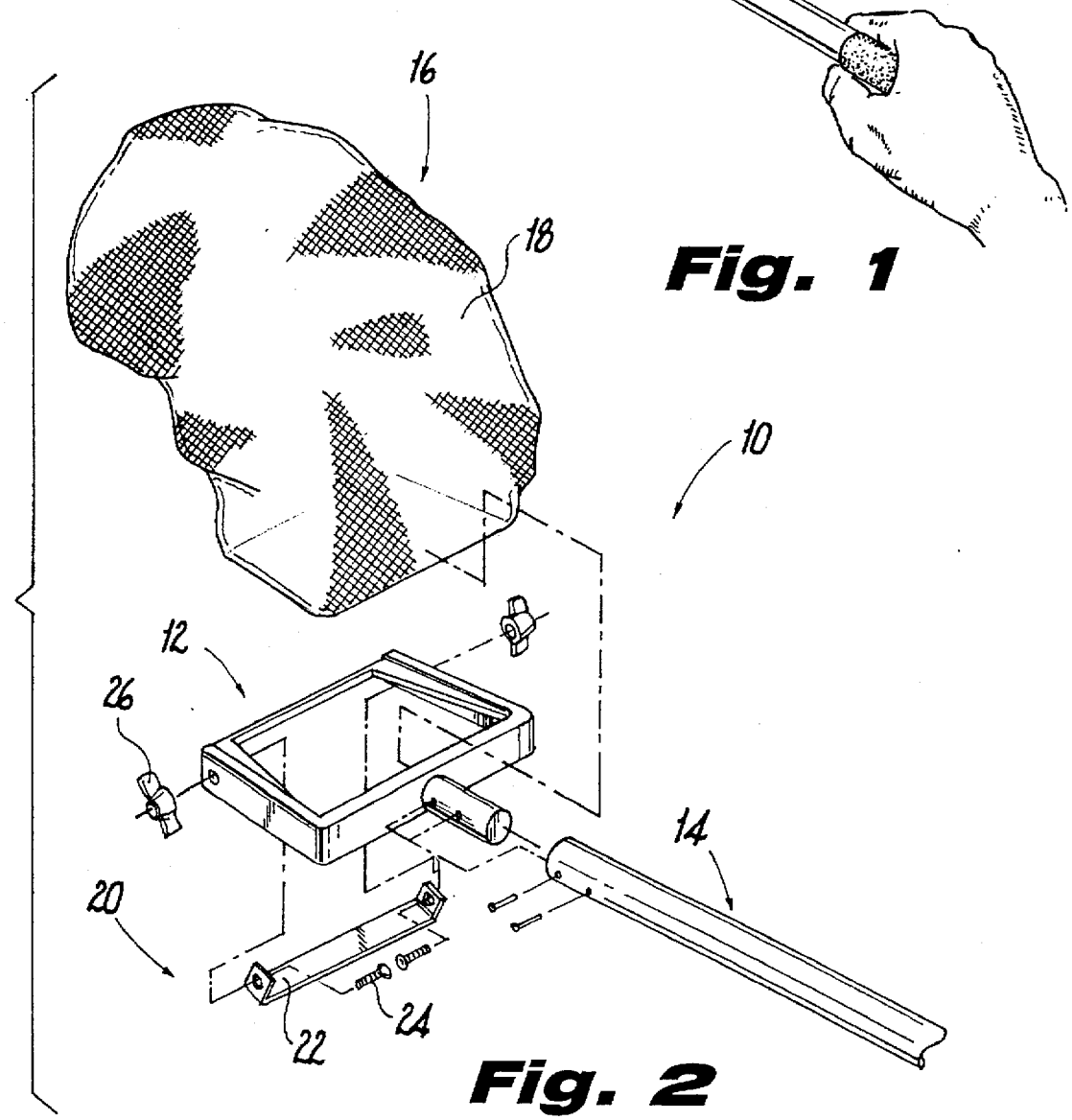
FIG. 2 is a perspective view, with parts separated, of the egg retriever of FIG. 1.

Referring now to the details of the invention as shown in the drawings, reference numeral 10 indicates generally the egg retriever. As illustrated by FIGS. 1 and 2, the egg retriever 10 is generally in the form of a customary net having a rim 12 connected to an elongated handle 14. A mesh net 16 is supported by the rim 12 to form a holding pouch 18 having an opening 19. A scoop portion 20 including a blade 22 is mounted to the rim 12 via screws 24 and bolts 26. The blade 22 is adapted for scooping an egg 28, specifically, an ostrich egg, into the holding pouch 18 as described below.

To retrieve a fertilized ostrich egg 28 the mesh net 16 is positioned above the egg 22, as shown by FIG. 3, and the handle 14 is shifted forward to position the blade 22 underneath the egg 28. The rim 12 may be pivotably connected to the handle 14 for enabling a user to properly position the blade 22 underneath the egg 28 without having to shift the handle 14. As the retriever 10 is moved towards the egg 28, the blade 22 scoops the egg 28 into the holding pouch 18, as shown by FIG. 4. Once the ostrich egg 28 is within the holding pouch 18, the retriever 10 is rotated one-quarter clockwise to safely secure the egg 28 within the holding pouch 18 as shown by FIG. 5. The retriever 10 is then pulled out of the ostrich pen to complete the retrieval of the ostrich egg 28.

An alternative embodiment of the egg retriever is illustrated by FIGS. 6–8. In this embodiment, the egg retriever 100 is generally in the form of a customary net having a rim 112 connected to an elongated handle 114. A mesh net 116 is supported by the rim 112 to form a holding pouch 118 having an opening 119. A scoop portion 120 including a movable blade 122 is mounted to the rim 112. The blade 122 is adapted for scooping an egg 28, specifically, an ostrich egg, into the holding pouch 118. The embodiment of FIGS. 6–8 further includes a closure assembly 130 for enabling the user to substantially close the opening 119 once the egg 28 is within the holding pouch 118 and a blade control assembly 132 for controlling the blade 122 from a proximal end of handle 114. By closing the opening 119 of the holding pouch 118 one ensures that the egg 28 will not be pushed out of the holding pouch 118 by the ostrich if it prematurely returns to the site of the egg 28 or that the egg 28 will not fall out of the holding pouch 118 during retrieval.

The closure assembly 130 includes a control ring 134 having a cord 136 attached thereto. The cord 136 transverses a portion of the longitudinal axis of handle 114 and wraps around the holding pouch 118. To substantially close the opening 119 of the holding pouch 118, the control ring 134 is pulled proximally to pull cord 136 proximally to create a cinching action, as shown by FIG. 7. To re-open the opening 119, the control ring 134 is pushed distally to loosen the push cord 136. The holding pouch 118 is then manually fanned to resume its open shape shown by FIG. 6. The closure assembly 130 may also utilize an elastic band or a cable wire instead of cord 136. It is also envisioned that the elastic band, cable wire, or cord be positioned within a collapsible rim instead of being wrapped around the holding pouch 118.

The blade control assembly 132 includes two handle bars 138 operatively associated with the blade 122 via two control rods 140 and two rod members 142 protruding from a distal end of each control rod 140. The control rods 140 transverse through a hollow interior 144 along the longitudinal axis of the handle 114 and a hollow interior 146 along the circumference of the rim 112. Each rod member 142 extends through the rim 112 and is positioned within a slot 148 in the blade 122.

To pivot the blade 122, the handle bars 138 are pulled proximally which causes the control rods 140 to be translated proximally within hollow interiors 144 and 146. As a result, the rod members 142 are forced to shift along slots 148. This causes the blade 122 to move along an arc, as shown by the arrow in FIG. 8. When the blade 122 is in the position illustrated by FIG. 8, the blade 122 will scoop the egg 28 within the holding pouch 118 as the retriever 100 is moved toward the egg.

Many modifications and variations of the present invention are possible in light of the above teachings. It is, therefore, to be understood that within the scope of the appended claims the invention may be practiced otherwise then as specifically described.

I claim:

1. A retrieval apparatus comprising:

a rim having a scoop portion thereon and defining an opening therein, the scoop portion including a blade pivotably mounted to said rim and operatively associated with a control mechanism for pivoting said blade; and a holding pouch positioned adjacent a periphery of the rim in alignment with the opening.

2. The retrieval apparatus of claim 1, further comprising an extension handle.

3. The retrieval apparatus of claim 1, further comprising closure means operatively associated with said holding pouch for substantially closing said opening.

4. The retrieval apparatus of claim 1, further comprising a handle connected to a portion of said rim.

5. The retrieval apparatus of claim 1, wherein said apparatus is capable of retrieving an ovoid object.

6. The retrieval apparatus of claim 5, wherein said ovoid object is an ostrich egg.

7. A retrieval apparatus comprising:

a net supported by a rim to define an opening and to form a holding pouch;

a handle connected to said rim;

a blade movably mounted to said rim; and control means operatively associated with said blade for controlling proximal and distal movement of said blade with respect to said handle; said control means including two handle bars connected to two control rods which traverse said handle and are connected to said blade via two rod members where longitudinal translation of said handle bars causes said blade to pivot.

8. The retrieval apparatus of claim 7, further comprising closure means operatively associated with said holding pouch for substantially closing said opening.

9. A retrieval apparatus comprising:

a net supported by a rim to define an opening and to form a holding pouch;

a blade pivotably connected to a portion of said rim;

a handle connected to said rim;

closure means for substantially closing said opening; and a control mechanism operatively associated with said blade for controlling pivotal movement of said blade.

10. The retrieval apparatus of claim 9, wherein said closure means includes a cord wrapped around said holding pouch and being operatively associated with a control ring, wherein a cinching action is created as said control ring is pulled proximally to substantially close said opening.

11. The retrieval apparatus of claim 9, wherein said apparatus is capable of retrieving an ovoid object.

12. The retrieval apparatus of claim 11, wherein said ovoid object is an ostrich egg.

* * * * *